No. 816,852.  
PATENTED APR. 3, 1906.  
E. EINFELDT.  
RUNNING GEAR FOR VEHICLES.  
APPLICATION FILED SEPT. 5, 1905.  
5 SHEETS—SHEET 1.

Witnesses  
Raymond F. Barnes.  
W. V. Klopfer.

Inventor  
Emil Einfeldt  
By Phil. T. Dodge  
Attorney

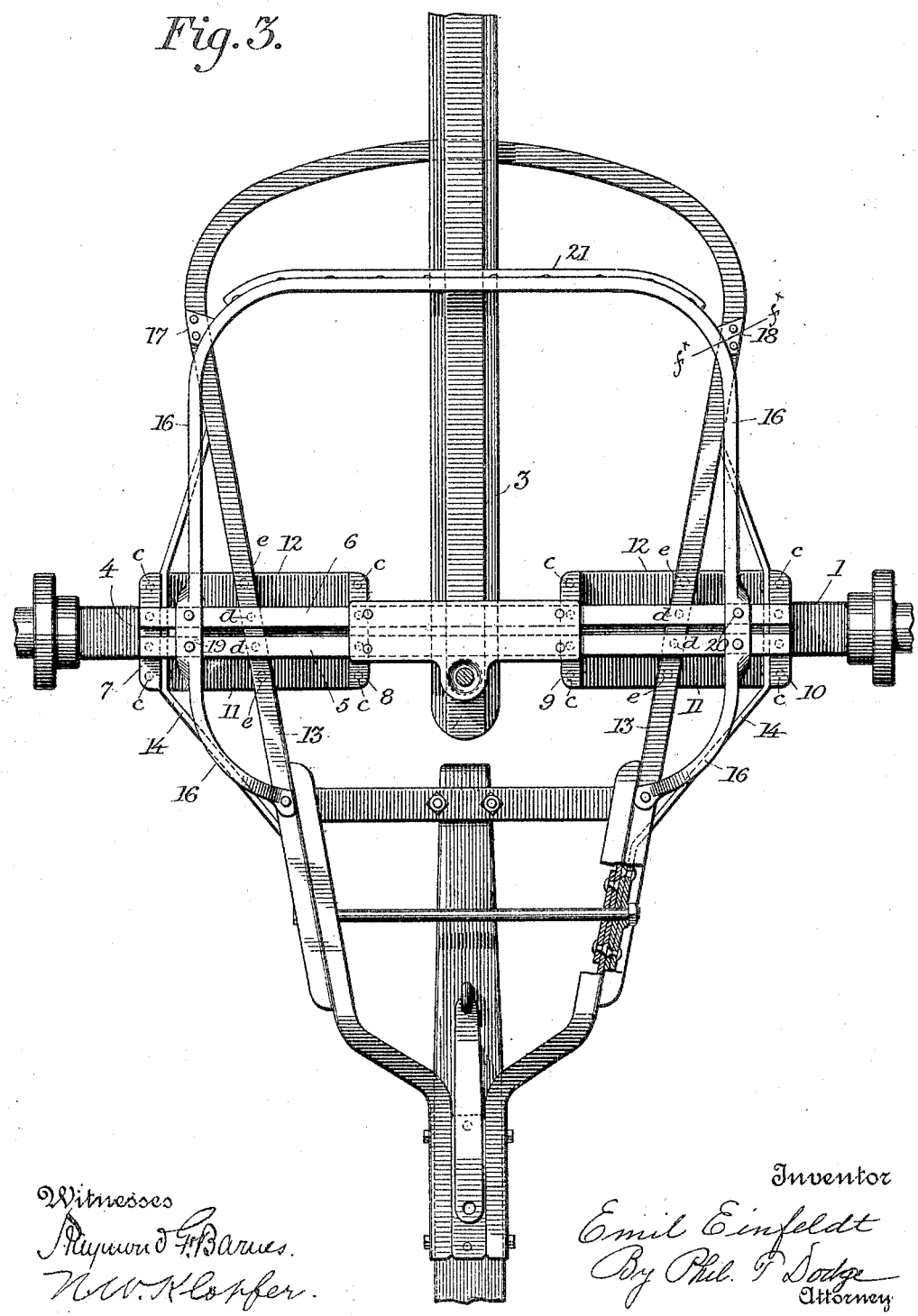

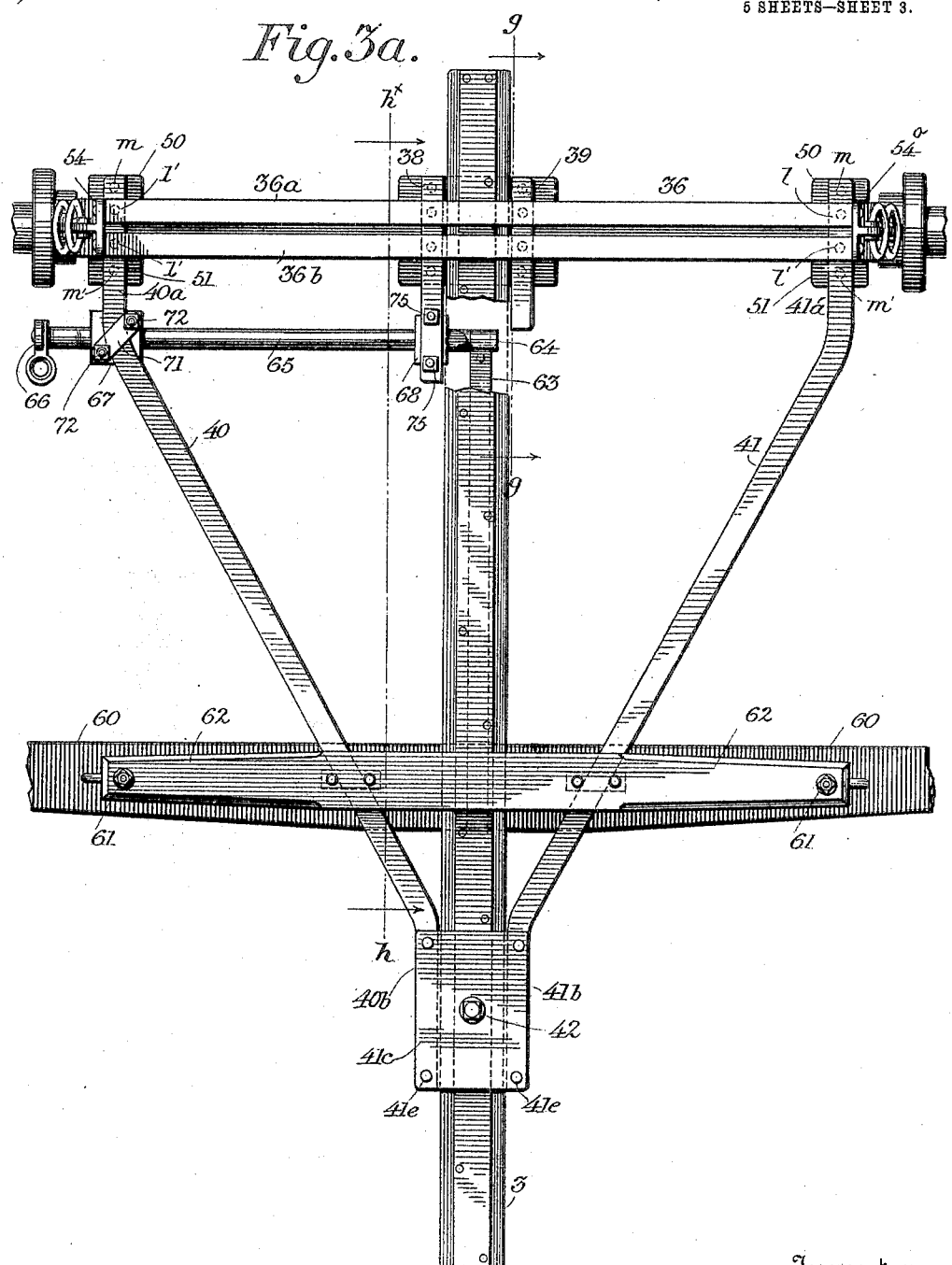

No. 816,852. PATENTED APR. 3, 1906.
E. EINFELDT.
RUNNING GEAR FOR VEHICLES.
APPLICATION FILED SEPT. 5, 1905.
5 SHEETS—SHEET 4.
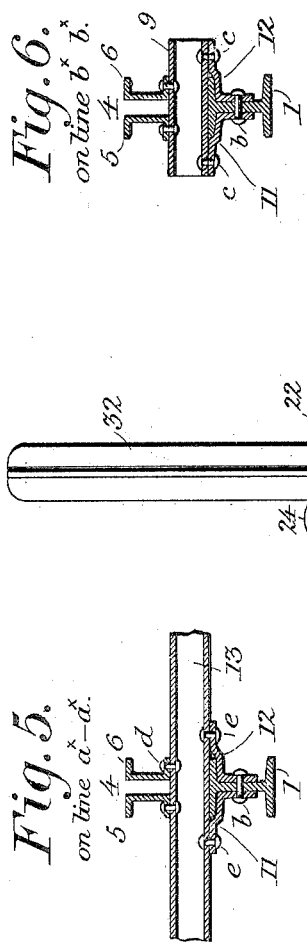
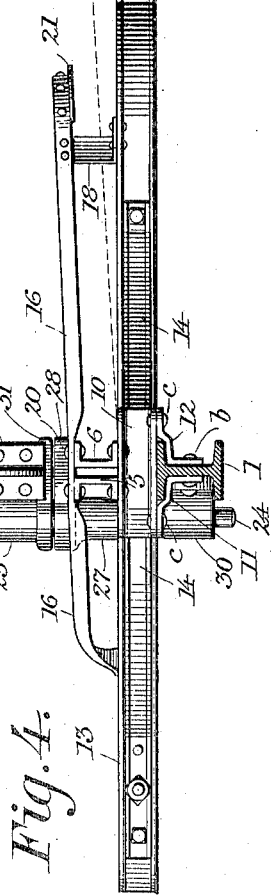
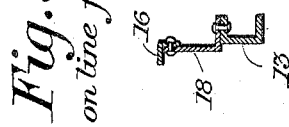
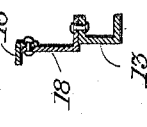
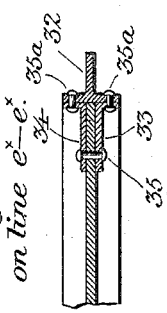
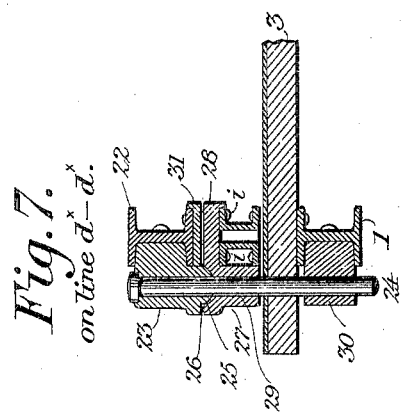
Witnesses
Raymond F. Barnes.
N. W. Klopfer.
Inventor
Emil Einfeldt
By Phil. F. Dodge
Attorney No. 816,852. PATENTED APR. 3, 1906
E. EINFELDT.
RUNNING GEAR FOR VEHICLES.
APPLICATION FILED SEPT. 5, 1905.
5 SHEETS—SHEET 5.
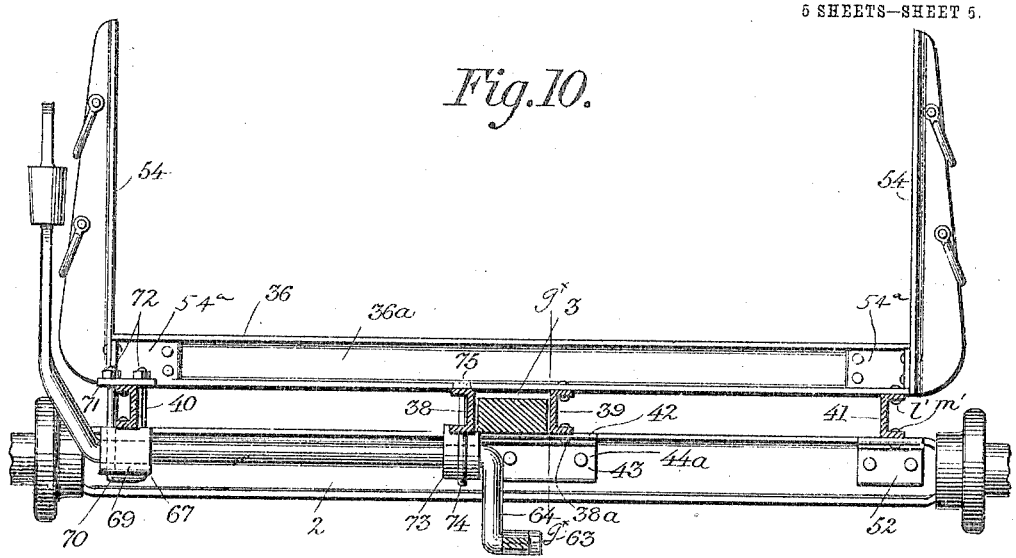
Fig. 10.
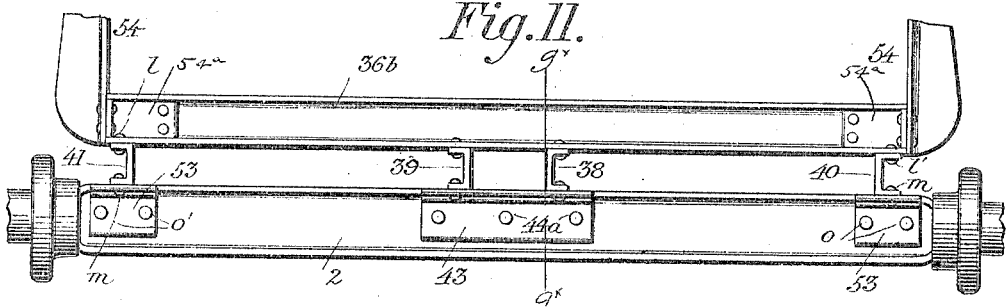
Fig. 11.
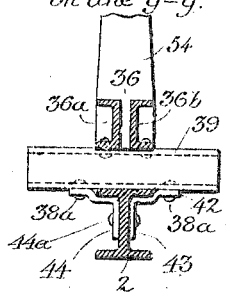
Fig. 12.
on line g-g.
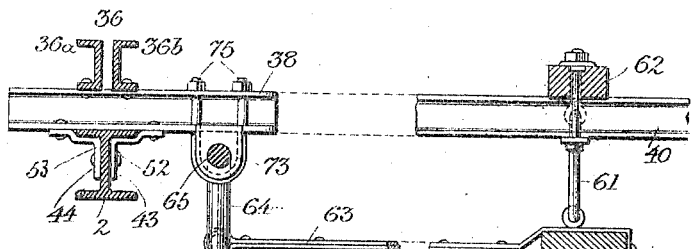
Fig. 13.
on line h-h.
Fig. 13ª.
Witnesses
Raymond F. Barnes.
N. W. Klopfer.
Inventor
Emil Einfeldt
By Phil T. Dodge
Attorney

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

RUNNING-GEAR FOR VEHICLES.

No. 816,852.        Specification of Letters Patent.        Patented April 3, 1906.

Application filed September 5, 1905. Serial No. 276,991.

*To all whom it may concern:*

Be it known that I, EMIL EINFELDT, of Davenport, county of Scott, and State of Iowa, have invented a new and useful Improvement in Running-Gears for Vehicles, of which the following is a specification.

This invention relates to running-gear for vehicles; and the invention consists in various improved features of construction designed for combined strength, durability and lightness, and economy in production, which features of construction will be fully described in the specification and their novel parts defined in the claims.

Figure 1:
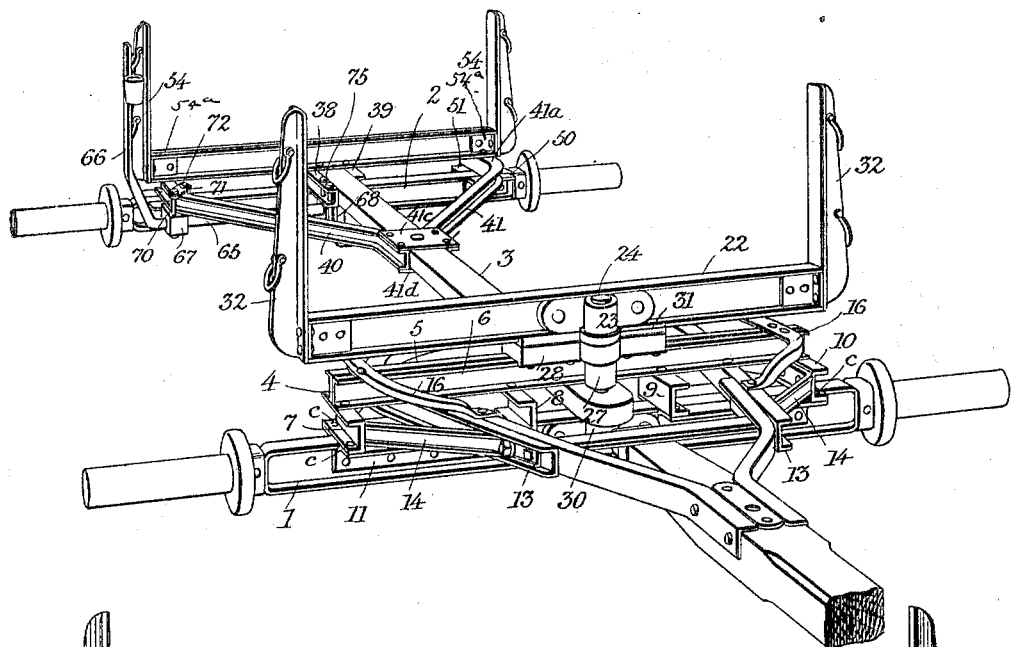
Figure 2:
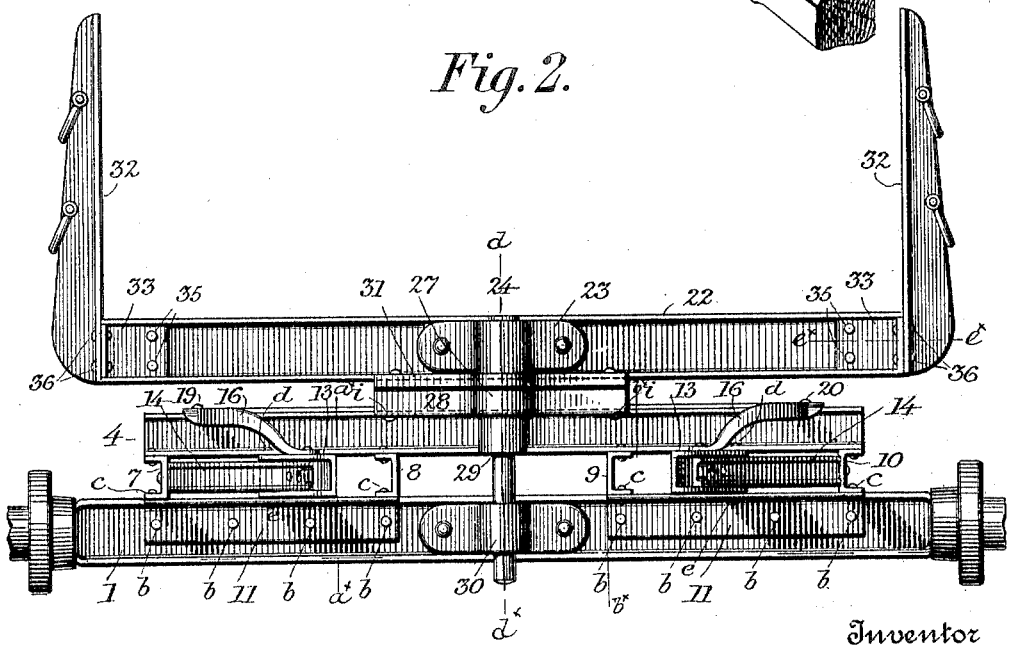

In the accompanying drawings, Figure 1 is a perspective view of my improved running-gear with the wheels removed. Fig. 2 is a front elevation of the front gear. Fig. 3 is a top plan view of the front running-gear with the front bolster removed to expose other parts to view. Fig. 3$^a$ is a top plan view of the rear gear. Fig. 4 is a side elevation of the front gear, partly in section. Fig. 5 is a vertical section through the sand-board, hounds, and axle on the line $a^\times a^\times$ of Fig. 2. Fig. 6 is a similar view on the line $b^\times b^\times$ of Fig. 2. Fig. 7 is a vertical sectional elevation on the line $d^\times d^\times$ of Fig. 2. Fig. 8 is a horizontal section on the line $e^\times e^\times$ of Fig. 2 through the end of the front bolster and stake. Fig. 9 is a vertical section on the line $f^\times f^\times$ of Fig. 3 through the hounds and the hound circle-iron. Fig. 10 is a front elevation of the rear gear. Fig. 11 is a rear elevation of the same. Fig. 12 is a vertical section through the same on the line $g^\times g^\times$ of Fig. 11. Fig. 13 is a vertical section on the line $h^\times h^\times$ of Fig. 3$^a$. Fig. 13$^a$ is a vertical sectional elevation, on an enlarged scale, through the front axle, sand-bolster, and intermediate chair-plate and connecting-brackets, showing particularly the upward inclination of the supporting-surface of the bracket-plates.

Referring to the drawings, 1 represents the front axle, 2 the rear axle, and 3 the reach connecting said axles. The axles are formed each of a section of I-beam having on their extremities bearing-spindles on which the wheels are mounted.

4 represents a sand-bolster extending above the front axle and consisting of two channel-bars 5 and 6 of ⊏ form in cross-section arranged side by side with a space between them and having their flanges extending horizontally outward. The sand-bolster is fixed firmly to the axle some distance above the same, and its two flanged members are held in fixed relations by means of a number of chair-plates 7, 8, 9, and 10—in the present instance four—each consisting of a section of channel-iron of ⊏ form in cross-section and extending in a fore-and-aft direction between the sand-board and axle, two on each side of the center, the upper flanges of the blocks being fastened to the lower flanges of the sand-bolster by means of rivets extending through said parts. The lower flanges of each pair of chair-plates are connected to the axle by means of two opposing angular bracket-plates 11 and 12, having their vertical portions applied to opposite sides of the web of the axle and fastened thereto by rivets $b$, extending through said parts and having their horizontal portions extending outwardly along the under sides of the upper flanges of the axle and beyond the same and presenting seats inclining slightly upward for the lower flanges of the chair-plates, as shown particularly in Fig. 13$^a$, to which projecting portions of the bracket-plates the flanges of the chair-plates are connected by rivets $c$, passing through said flanges. By the employment of bracket-plates applied in the manner described in effecting the connection of the sand-bolster with the axle the upper flanges of the axle are left intact and are free from holes or recesses, and inasmuch as the sustaining strength of bars of this form resides mainly in the flanges the full strength of the axle by my improved construction is left unimpaired. By inclining the horizontal projecting portions of the bracket-plates slightly upward their supporting surface or seat for the sand-bolster is at a slightly higher level than the upper surface of the axle, and consequently the sand-bolster and portions sustained by it receive their main support from the bracket-plates, which are in turn sustained by the web of the axle. The construction also admits of the sand-bolster being drawn down tightly against the upper flanges of the axle by means of the rivets $c$, thus preventing any looseness or rattling of the parts.

13 represents the front gear-hounds in the form of a single section of channel-bar bent into the form of a loop and arranged with the flanges outward, the front ends terminating as usual some distance in front of the axle for the attachment of the tongue. These hounds extend between the axle and the sand-bolster, to which parts they are connected in a manner similar to the connection thereto of the chair-plates, the upper flanges of the hounds being riveted to the lower flanges of the sand-bolster by rivets *d* and the lower flanges of the hounds being riveted to the projecting ends of the bracket-plates on the axle by rivets *e*. The hounds are braced to the sand-bolster and axle each by means of a brace-rod 14, riveted between its ends to the inner face of the outer chair-plate and riveted at its ends to the outer sides of the vertical web of the hounds.

16 represents the hound circle-iron formed of a length of angle-bar with the upper flange presented inward. In rear of the axle the circle-iron extends, as usual, transversely across the hounds and is firmly fastened to them a slight distance above the same by means of two L-shaped bracket-plates 17 and 18, Figs. 3 and 9, the vertical portion of which plates is riveted to the vertical flange of the circle-iron, while the horizontal portion is riveted to the horizontal flange of the hounds. From these points the two limbs of the circle-iron extend forward and across the upper horizontal flanges of the sand-bolster, to which they are riveted, as at 19 and 20, the circle-iron being flattened at this point to afford a wide bearing-surface against the upper flanges of the sand-bolster. At their forward ends the limbs of the circle-iron are bent downwardly, flattened, and riveted to the upper flanges of the hounds. At its rear extremity, where the circle-iron extends transversely across the hounds, the former is provided with a wear-plate 21, consisting of a length of angle-iron having its vertical flange seated and secured against the inner face of the vertical flange of the circle-iron and having its horizontal flange extending rearwardly and presenting a horizontal wear and bearing surface for the reach.

22 represents the front bolster, formed of a length of I-beam having fastened to the front face of the vertical web and between the upper and lower flanges a bearing-block 23, formed with a vertical hole to receive a king-bolt 24. The bottom of this block where it projects beyond the lower flange of the bolster is formed with a depending rounded bearing-surface 25, adapted to fit loosely and receive a bearing in a correspondingly-formed recess 26 in the upper end of a cylindrical block 27, projecting forwardly from the front edge of a horizontal wear-plate 28, seated on the upper flanges of the sand-bolster and secured thereto by rivets *i* or by other suitable fastening means. The block 27 is provided with a vertical hole 29 in line with the hole in the block 23, through which the king-bolt passes, which latter serves to effect, as usual, a pivotal connection of the bolster with the sand-board, the rounded projection on the block 23 serving, in connection with the socket in block 27, to admit of a slight rocking motion of the bolster and acting to prevent undue side strain on the king-bolt. Below the sand-bolster the king-bolt extends through an opening in the forward end of the reach and through a hole in a block 30, fixed to the web of the axle between the front flanges thereof. In order to prevent wear between the bottom of the bolster and the wear-plate 28 on the sand-bolster, I apply to the under side of the bolster and rivet to the bottom flanges of the same a wear-plate 31, which in the movements of the bolster contacts and bears against the wear-plate on the sand-board. At its ends the bolster is provided with stakes or standards 32, each consisting of a section of T-iron having the central web extending outwardly and suitably tapered and the flanges arranged inwardly to present a flat surface to afford a bearing for the side of the wagon-body. The flanges of the stake at its lower end are seated against the end of the bolster and firmly fastened thereto by means of two opposing angle-plates 33 and 34, set in the angles formed by the web of the bolster and the flanges of the stake and firmly fastened to said parts by means of rivets 35, passing through the angle-plates and web of the bolster, and rivets $35^a$, passing through the angle-plate and flanges of the stake.

Referring to the construction of the rear gear, (illustrated more particularly in Figs. $3^a$, 10, 11, 12, and 13,) 36 represents the rear bolster, which is of a form and construction similar to the sand board or bolster, consisting of two sections of channel-iron $36^a$ $36^b$, arranged with a space between them and with their flanges extending horizontally outward. The bolster is sustained above the axle with its two members held in fixed relations and firmly connected with the axle by means of two chair-plates 38 and 39 near its center and by rear hounds 40 and 41 near its ends. The chair-plates are each of the construction and form of those of the front gear above described, being arranged in a fore-and-aft direction, one on each side of the center of the axle, with their horizontal flanges extending outwardly in opposite directions and their vertical portions facing each other and at such distance apart as to admit the reach between them, thereby constituting, in effect, a guide for the reach. The lower flanges of the chair-plates are riveted, as at $38^a$, to outwardly-projecting horizontal flanges 42 of opposing bracket-plates 43 and 44, having their vertical portions applied to the opposite sides of the web of the axle and firmly connected to the same by rivets $44^a$, extending through said parts.

The rear hounds 40 and 41 consist each of a section of channel-bar of ⌷ form in cross-section with their rear ends extending in a fore-and-aft direction, as at 40ª and 41ª, between the bolster and axle, whence they extend forwardly and inwardly at an inclination and have their front ends extending longitudinally side by side, as at 40ᵇ and 41ᵇ, with a space between them to receive the reach and suitably connected together and held spaced apart by upper and lower plates 41ᶜ and 41ᵈ, riveted, as at 41ᵉ to the outwardly-extending flanges of the hounds. The upper and lower plates are provided with holes to receive a vertical pivot-bolt 42, extending through them and through the reach and serving to effect the connection of the rear gear with the reach. The rear ends of the hounds where they extend between the bolster and axle, are connected to these parts by rivets *l l'*, extending through the upper flanges of the hounds and lower flanges of the bolster, and by rivets *m m'*, extending through the lower flanges of the hounds and horizontal projecting portions 50 and 51 of angle-plates 52 and 53, applied to opposite sides of the web of the axle and fastened thereto by rivets extending through the vertical portions of the bracket-plates and through the web of the axle. At its ends the bolster is provided with stakes 54, each consisting of a section of T-iron having the central web suitably tapered and oppositely-extending flanges similar to the front stakes, the flanges being seated against the ends of the bolster and firmly fastened in an upright position by means of opposing angle-plates 54ª, riveted to the bolster and to the flanges of the stakes.

The rear gear is provided with a brake mechanism comprising a transverse brake-beam 60, suspended by links or chains 61 from the ends of a transverse suspension-bar 62, fixed to the rear hounds. The brake-beam is connected at its center by means of a longitudinally-extending link 63 with a crank 64 on the inner end of a horizontal transverse brake-shaft 65, the outer end of which shaft is formed with an upturned operating-lever 66. The shaft is mounted to rock in an outer bearing 67, sustained by the rear hound 40, and an inner bearing 68, sustained by the chair-plate 38, this chair-plate being extended forwardly beyond the companion chair-plate in order that it may serve to sustain the shaft-bearing. The outer bearing 67 comprises a bearing-block 69, having a horizontal hole to receive the shaft, which block is held firmly against the under side of the hound 40 by means of a staple-bolt 70, embracing the block and the hound and confined by means of a strap 71 and nuts 72. The inner bearing 68 comprises a bearing-block 73, formed with a hole to receive the shaft and held fixedly against the under side on the extension of the chair-plate 38 by means of a staple-bolt 74, embracing the block and extending upwardly through the two flanges on the chair-plate and confined by nuts 75.

My improved running-gear as a whole is constructed entirely of metal in which commercial angle-bars and channel-iron are employed throughout, and in the assembling of the various parts of the gear and their connection they are so constructed relatively as to secure the greatest simplicity consistent with durability and strength. In the connection of the various parts of the front and rear gears the arrangement and construction is such that, while securing a firm union, the sustaining strength of the various parts is not impaired.

Having thus described my invention, what I claim is—

1. In a running-gear the combination of an axle having a vertical web and a horizontal flange, a bolster thereover, an angular bracket-plate attached to the web of the axle and projecting horizontally outward beyond the flange of the same, and an intermediate spacing member connected respectively to said bolster and with the projecting portion of the bracket-plate.

2. In a running-gear the combination of an axle having a vertical web and horizontal flanges, a bolster provided with a horizontal flange, an angular bracket-plate connected with the web of the axle and projecting outwardly beyond the flange of the same, and a chair-plate seated between the bolster and axle and fastened respectively to the flange of the bolster and to the projecting portion of the bracket-plate.

3. In a running-gear the combination of an axle embodying a vertical web and oppositely-extending horizontal flanges, a bolster, angular bracket-plates attached to opposite sides of the web of the axle and projecting outwardly in opposite directions therefrom beyond the edge of the flanges, and a spacing member between the bolster and axle, said spacing member being fixed to the bolster and provided with a flange fixed to the projecting portions of the bracket-plates.

4. In a running-gear the combination of an axle having a vertical web and oppositely-extending flanges at the top, a bolster formed with horizontal flanges at the bottom, angular bracket-plates secured to the vertical web of the axle and projecting outwardly beyond the flanges of the same, and fore-and-aft-spacing members formed with upper and lower flanges connected respectively with the flanges of the bolster and with the projecting portions of the bracket-plates.

5. In a running-gear the combination of an axle formed with a vertical web and a horizontal flange, a bolster, hounds fixed to the bolster and provided with a lower flange, and an angle-plate fixed to the web of the axle, projecting outwardly beyond the flanges of the same and connected with the lower flange of the hounds.

6. In a running-gear the combination of an axle provided with a vertical web and a horizontal flange, hounds extending across the axle at opposite sides of the center and formed with upper and lower horizontal flanges, bracket-plates fixed to the web of the axle and having a horizontal portion extending beyond the flange of the axle and connected with the lower flange of the hounds, and a bolster seated on the hounds and formed with a flange fixed to the upper flange of the hounds.

7. In a running-gear the combination of an axle provided with a vertical web and oppositely-extending horizontal flanges, two pairs of angular bracket-plates, the plates of each pair being applied to opposite sides of the web of the axle and riveted to the same and formed with horizontal portions projecting in opposite directions beyond the flanges, a plurality of fore-and-aft chair-plates formed with upper and lower flanges, said chair-plates being seated on the projecting portions of the bracket-plates and having their bottom flanges riveted to the projecting bracket-plates, and a bolster formed with a bottom flange seated on and riveted to the upper flange of the chair-plates.

8. In a running-gear the combination of an axle formed with a vertical web and oppositely-extending horizontal flanges, bracket-plates formed with a vertical portion attached to said web, and with a horizontal portion extending outwardly beyond the flanges and at an inclination upward above the upper face of said flanges, a bolster, and intermediate spacing members fixed to the bolster and formed with a bottom flange fixed to the upwardly-inclined projecting portion of the bracket-plates.

9. In a running-gear the combination of an axle, a sand-bolster thereover, hounds extending between said parts and secured to the same, spacing members extending between the axle and bolster and fastened to the same, and hound-braces fastened to the spacing members and to the hounds.

10. In a running-gear the combination of an axle, a sand-bolster thereover, hounds extending between the axle and bolster and fastened to the same, fore-and-aft chair-plates between the axle and bolster at the outer sides of the hounds and secured to said axle and bolster, and hound-braces fastened between their ends to the chair-plates, and connected at their ends with the hounds.

11. In a running-gear the combination of an axle, a sand-bolster thereover, hounds extending between said parts, and a hound circle-iron, comprising an angle-bar bent in the form of a loop with its forward ends fastened to the hounds, the said angle-bar being flattened and applied to the top of the bolster and the flattened portion fastened to the same.

12. In a running-gear for vehicles, the combination of an axle, hounds secured thereto, a hound circle-iron, and an intermediate connecting angle-plate formed with a horizontal portion seated on and riveted to the hound, and with a vertical portion seated against and riveted to the circle-iron.

13. In a running-gear the combination of an axle, hounds secured thereto, a hound circle-iron formed with a horizontal top flange and with a vertical flange, and angle-plates having their vertical portion fastened to the vertical flange of the circle-iron, and their horizontal portion fastened to the upper side of the hounds.

14. In a running-gear the combination of an axle, hounds secured thereto, a hound circle-iron fixedly sustained with reference to the hounds and extending transversely above the same in rear of the axle, said circle-iron being formed with a horizontal inwardly-extending top flange, and with a vertical flange, and a wear-plate formed with a vertical flange seated and secured to the vertical flange of the circle-iron, and having a horizontal flange extending rearwardly from said circle-iron and serving as a bearing-surface for the reach.

15. In a running-gear the combination of an axle, a sand-bolster fixed thereover and formed with a rounded bearing-socket having a hole therethrough for the king-bolt, and a bolster surmounting the sand-bolster and formed with a depending rounded projection to enter said socket in the sand-bolster, said projection having an opening therethrough for the king-bolt.

16. In a running-gear the combination of an axle formed with a vertical web and forwardly-extending upper and lower flanges, a king-bolt bearing-block fixed to said web and extending beyond the flanges, a sand-bolster fixed above the axle, a king-bolt bearing-block extending at the front of the sand-bolster, a bolster surmounting the sand-bolster and formed with a vertical web and forwardly-extending flanges, a king-bolt bearing-block connected with the web of said bolster and extending beyond the flanges, and a king-bolt extending downward through said bearing-blocks.

17. In a running-gear the combination with the bolster formed with a vertical longitudinal web, of a stake having a transverse flange seated against the web, and an angle-plate seated in the angle formed by the web and flange and secured to said parts.

18. In a running-gear the combination with a bolster formed with upper and lower oppositely-extending horizontal flanges, and with a central longitudinal connecting-web, of a stake formed with a flat transverse flange seated against the end of the bolster, and angle-plates formed with a longitudinal portion and with a transverse portion, said angle-plates being seated in the angles formed by the flanges of the bolster and flange of the stake, with the longitudinal portion of the angle-plates fastened to the web and the transverse portion of the angle-plates fastened to the flange of the stake.

19. In a running-gear the combination with a bolster of I form in cross-section, of a stake of T form in cross-section seated against the end of the bolster, and opposing angle-plates seated in the angles formed by the bolster and stake and firmly fastened to the same.

20. In a running-gear for vehicles, the combination of the rear axle and bolster thereover, intermediate spacing members connected with the bolster and axle and arranged with a space between them to receive and guide the reach, a brake-shaft bearing sustained by one of the spacing members; whereby this spacing member serves the threefold function of spacing the axle and bolster at the center, guiding the reach, and sustaining the brake-shaft bearing, a hound extending between the axle and bolster, a brake-shaft bearing sustained by said hound, a brake-shaft mounted in said bearings, and a brake mechanism operatively connected with the shaft.

21. In a running-gear and in combination with the rear axle, a bolster thereover, a fore-and-aft chair-plate extending between the axle and bolster and formed with upper and lower horizontal flanges arranged outwardly, hounds extending between and secured to the bolster and axle, a brake-shaft bearing-block on the under side of the lower flange of the chair-plate, a staple-bolt embracing said block and extending upwardly through the flanges of said chair-plate, a brake-shaft bearing applied to the under side of one of the hounds, a staple-bolt embracing said bearing and the hound, a brake-shaft mounted in said bearings, and a brake mechanism operatively connected with said shaft.

In testimony whereof I hereunto set my hand, this 18th day of July, 1905, in the presence of two attesting witnesses.

EMIL EINFELDT.

Witnesses:
M. LOUISE DODGE,
S. P. RICHARDSON.